Nov. 2, 1954
F. L. O. ROEHRIG
2,693,137
ROTARY MOUNTED LENS CAMERA
Filed Jan. 10, 1951
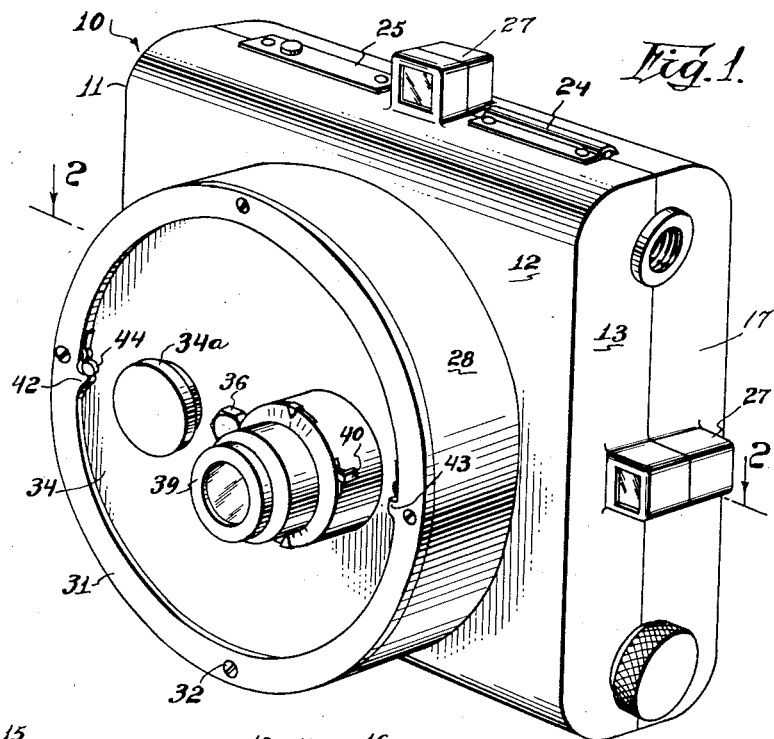
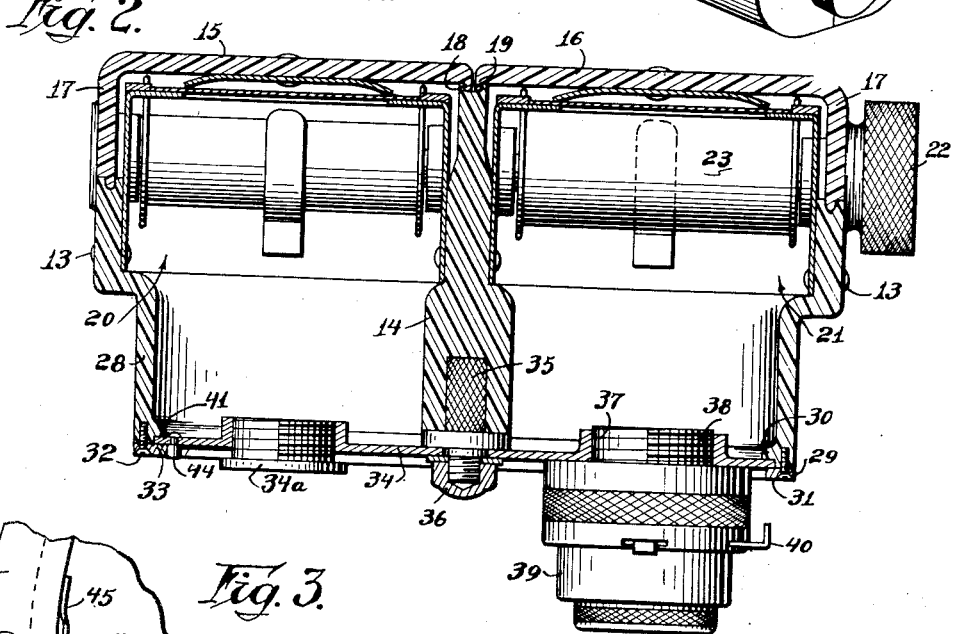
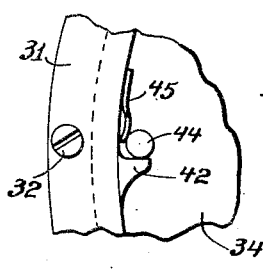
INVENTOR.
Frederick L. O. Roehrig,
BY
Wilfred E. Lawson
Attorney.

United States Patent Office 2,693,137
Patented Nov. 2, 1954

2,693,137
ROTARY MOUNTED LENS CAMERA

Frederick L. O. Roehrig, Yucaipa, Calif.

Application January 10, 1951, Serial No. 205,240

1 Claim. (Cl. 95—11)

This invention relates to photograph apparatus and more particularly to a camera having two films which may be separately exposed. The general objective of the invention is to provide a novel camera construction having two films and a single lens so arranged that pictures may be taken on either film, the lens being so mounted as to be shifted in position for exposing either of the films.

A more particular object of the invention is to provide a two-film camera having two exposure chambers, each provided with a shutter and a lens mounting adapted to be shifted in position from one exposure chamber to the other.

Another object of the invention is to provide a two-film camera construction having a single objective lens so mounted as to be swung from position in front of one exposure chamber to the other. Another object of the invention is to provide a novel camera construction as set forth in the preceding object wherein the objective lens is mounted on a pivoted plate that may be rotated so as to present the lens along the optical axis of each of the exposure chambers. Other objects and advantages will appear and be brought out more fully in the following specification, reference being had to the accompanying drawing.

In the drawing:

Figure 1 is a perspective view of a two-film camera embodying my invention;

Figure 2 is a sectional view taken along the line 2—2 of Figure 1;

Figure 3 is a fragmentary view enlarged showing stop features of the invention.

Referring to the drawing in detail, this invention comprises a box like camera 10 having a front section 11 comprising a front wall, side walls 13 and an intermediate wall 14 which extends rearwardly from front wall 12 and is preferably formed integrally therewith. The camera has a pair of back sections 15 and 16 each formed with a side wall 17 which mate with walls 13 of the front section and flanges 18 which fit in a groove 19 in intermediate wall 14 of the front section 11. Thus two compartments or exposure chambers 20 and 21 are provided for mounting a pair of films, the construction of intermediate wall 14 being such as to provide a light seal between the two compartments. A film winding spindle having a winding knob 22 extends through each side wall 17 of each compartment and conventional shaft sections are provided in each compartment for receiving film rolls 23. A hinge 24 is provided in back sections 15 and 16 by which they are secured to the front section 11 and a latch 25 for the back sections of any desired type is also provided, a hinge 24 and a latch 25 being positioned on each end of the camera for the respective back sections in alternate arrangement as should be clear. One or more sights 27 of any conventional or desired form may be provided and positioned on the top or sides of the camera.

An annular wall 28 extends forwardly from front wall 12 and has a rim 29 formed with a flange 30 which together with a ring 31 secured to the rim as by screws 32 forms an annular channel 33. A disc or circular wall 34 has a central opening for positioning on a stud shaft 35 which is embedded in the intermediate wall 14 and has a threaded outer end portion provided with a locknut 36. By this construction disc 34 is rotatable on shaft 36 with the peripheral edge portion of the disc lying in channel 33 which provides a light seal for exposure chambers 20 and 21.

Disc 34 has an eccentrically positioned flanged opening 37 which is threaded to receive the threaded end portion 38 of an objective lens tube or assembly 39, the assembly having a shutter lever 40. The peripheral marginal edge portion of disc 34 is designated 41 and ring 31 is formed with a pair of inwardly extending stops 42 and 43. A pin 44 extends forwardly from disc 34 so as to engage stops 42 and 43 and a spring latch 45 is secured on ring 31 adjacent to each of stops 42 and 43 for restraining rotational movement of disc 34 when pin 44 is engaged with one of the stops. The operation of the invention should be clear from the above description. The camera can be loaded with a film in each of the exposure chambers and inasmuch as camera fans frequently prefer to make shots with different types of film, for instance panchromatic and Kodachrome, one or more such shots can be made with the objective lens 39 positioned as shown in Figures 1 and 2, for exposure of the film in exposure chamber 21. If now it is desired to make one or more shots from the film in exposure chamber 20, disc 34 can be rotated a half turn to the right which rotation will be limited by stop 43 when pin 44 engages the stop and lens assembly 39 will be aligned with the optical axis of film exposure chamber 20 and this selective use of the films in the two chambers can be made in any desired sequence.

While in the foregoing there has been shown and described the preferred form of this invention, it is to be understood that minor changes in the details of construction, combination and arrangement of parts may be resorted to without departing from the spirit and scope of the invention as claimed.

I claim:

A two-film camera comprising a film housing having a front wall provided with a circular opening, an annular wall carried by and extending forwardly from the front wall concentric with said opening, a central division wall in said housing and extending into said annular wall to divide the housing and annular wall onto two film chambers, a disk wall overlying and closing the forward end of said annular wall, a pivot coupling between the center of the disk wall and said division wall whereby the disk wall may be rotated, said disk wall having an eccentric threaded opening for reception of a lens unit, an annular flange adjacent the inner side of the forward end of said annular wall, a flat ring secured to the forward end of edge of said annular wall with its inner edge portion spacedly overlying said flange to form a channel therebetween, said disk wall having its edge engaged in said channel for turning movements relatively to said annular wall, and co-acting stop elements comprising two stop lugs carried upon the inner side of said ring at diametrically opposite positions thereon and extending radially inwardly and a pin carried by said disk wall for engagement with said lugs for limiting the turning movement of the disk wall to either of two positions in each of which positions the center of the lens unit opening is in the optical axis of the film chamber, and a spring latch secured to the inside edge of said ring adjacent to each stop lug for engagement by said pin to hold the disk wall against free movement.

References Cited in the file of this patent

UNITED STATES PATENTS

| Number | Name | Date |
| --- | --- | --- |
| 1,884,733 | Kindelmann et al. | Oct. 25, 1932 |
| 2,185,508 | Kunze | Jan. 2, 1940 |
| 2,204,819 | O'Brien | June 18, 1940 |
| 2,245,606 | Rauch | June 17, 1941 |
| 2,315,284 | Thompson | Mar. 30, 1943 |
| 2,575,536 | Thompson | Nov. 20, 1951 |